July 9, 1963

O. TREIER 3,096,838

DEVICES FOR PRE-SETTING OF REQUIRED WEIGHTS
IN DIALLED WEIGHING MACHINES

Filed June 27, 1960

INVENTOR
OTTO TREIER

BY Toulmin & Toulmin

ATTORNEYS

United States Patent Office 3,096,838
Patented July 9, 1963

3,096,838
DEVICES FOR PRE-SETTING OF REQUIRED WEIGHTS IN DIALLED WEIGHING MACHINES
Otto Treier, Schwanden, Glarus, Switzerland, assignor to Verwaltungsgesellschaft der Werkzeugmaschinenfabrik, Oerlikon (A.G.), Zurich-Oerlikon, Switzerland
Filed June 27, 1960, Ser. No. 38,897
Claims priority, application Switzerland, June 27, 1959
7 Claims. (Cl. 177—80)

The invention relates to a device for pre-setting of required weights in dialled weighing machines, and is characterized in that it is provided with an adjusting shaft on which there is securely mounted an adjusting arm which carries a signalling device which cooperates with the pointer of the dialled weighing machine, the adjusting shaft being driven by coaxial planetary gears which are connected in series, and the number of which corresponds to the number of decimals provided in the graduation of the dial, a reversibly driven driving shaft for driving the said planetary gears being provided, and plate cams or control discs for the planetary gears being respectively rotatably mounted on the driving shafts, the control disks being adapted to be coupled to the driving shaft by a friction clutch, and being respectively provided with pinions which drive the drive gear of the corresponding planetary gear, and the control disks being each provided with locking means which are controlled by an electric control device, so that the control disks of the planetary gears are respectively released to carry out the number of revolutions corresponding to the required adjustment of the corresponding decimal.

By this device the pre-setting of required weights in dialled weighing machines is considerably accelerated and is effected with a greater accuracy than is possible with the devices hitherto used for this purpose. The weighing of goods of any kind, particularly, for example, the weighing of liquid or other components of mixtures capable of being poured, may thereby be substantially accelerated and improved.

Figure 2:
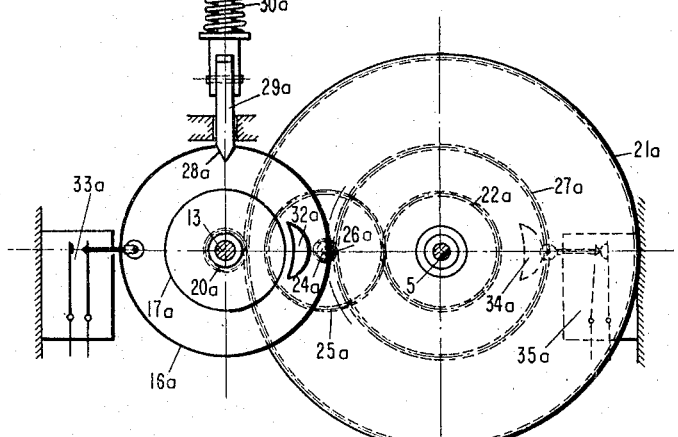
Figure 1:
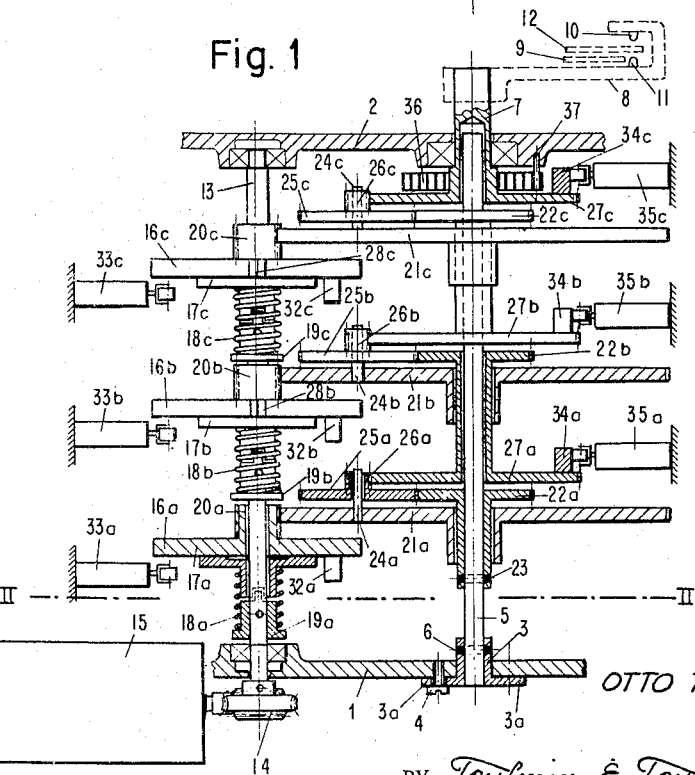

One construction of the subject matter of the invention is illustrated by way of example in the drawings, in which, FIGURE 1 is an axial section through a device for the presetting of required weights in dialled weighing machines, and FIGURE 2 is a section on the line II—II in FIGURE 1.

The illustrated device for the pre-setting of required weights is intended for dialled weighing machines having a dial graduation of from 1 to 1000 ranging over 360°, and is provided in a housing of which only part of the front wall 1 and part of the rear wall 2 are shown in the drawings. Inserted in the front wall 1 is a bushing 3, the flange of which bears externally against the front wall 1, and which is secured in position by a screw 4. Mounted in the bushing 3 is one end of a shaft 5 which is held in position by a pin 6, so as to be non-rotatable in the bushing. The other end of the shaft 5 is mounted in an axial bore provided in an adjusting shaft 7 extending coaxially with the shaft 5 and rotatably mounted in the rear wall 2. Mounted securely on the stub of the adjusting shaft 7 which projects rearwardly from the rear wall 2, is an adjusting arm 8 gripping with its bentover end the dial 9 of the dialled weighing machine, the dial being provided concentrically with the adjusting shaft 7. The inside of the bentover end of the adjusting arm 8 is provided with an electric light source 10, the outer straight part of the adjusting arm being provided with a photoelectric cell which faces the light-source 10. The photoelectric cell 11 operates a signal and/or controls the feed valve, not shown, for the material to be weighed. When the pointer 12 of the dialled weighing machine reaches a position between the light-source 10 and the photoelectric cell 11, the latter is no longer exposed to light with the result that the signal is operated and/or the feed valve is closed. A driving shaft 13 extending parallel to the shaft 5 is mounted in the front and rear walls 1 and 2 and can be driven by a reversible electric motor 15 through a worm gear 14.

Three coupling or follower devices which are each provided with a planetary gear, are provided for adjustment of the adjusting arm 8 by the driving shaft 13, the planetary gears being connected in series and thus cooperating, one planetary gear being provided for adjustment of the units, one for adjustment of the tens, and one for adjustment of the hundreds. The construction of the coupling or follower devices and of the planetary gears is as follows:

Mounted on the driving shaft so as to be rotatable, but not displaceable in the axial direction, are three plate cams or control discs 16a, 16b, and 16c, which are respectively coupled frictionally to the driving shaft 13 through clutch discs 17a, 17b, 17c, which are in rotational connection with, but axially displaceable on the driving shaft 13, and are respectively pressed against the control disks 16a, 16b, and 16c by pressure springs 18a, 18b, and 18c which are respectively supported by the bushings 19a, 19b, 19c secured to the driving shaft 13. The control disks 16a, 16b, 16c are respectively provided with pinions 20a, 20b, 20c, which are respectively in engagement with drive gears 21a, 21b, and 21c of one of the planetary gears. The drive gear 21a is mounted on the hub of a sun gear 22a, which is mounted on a shaft 5, and secured thereto by a pin 23. Securely inserted in the drive gear 21a and parallel to the shaft 5 is an axle journal 24a which carries a planet pinion 25a which meshes with the sun gear 22a.

Secured to the planet pinion 25a is a pinion 26a which is in engagement with a driven gear 27a, which is rotatably mounted on the shaft 5, and on the hub of which the drive gear 21b is rotatable. An axle journal 24b which carries a planet pinion 25b meshing with a sun gear 22b which is secured to the hub of the gear 27a is also inserted in the drive gear 21b. Connected securely to the planet pinion 25b is a pinion 26b which is in engagement with a driven gear 27b which is freely rotatable on the shaft 5, the drive gear 21c being rotatable on the hub of the driven gear 27b. Also inserted in the drive gear 21c is an axle journal 24c, which carries a planet pinion 25c meshing with a sungear 22c which is secured to the hub of the driven gear 27b. A pinion 26c, secured to the planet pinion 25, engages with a driven gear 27c which is secured to the adjusting shaft 7. The selected number of teeth of the interengaging pinions and gears 20a—21a; 25a—22a; and 26a—27a, is such as to give one revolution of the driven gear 27a for ten revolutions of the pinion 20a. The number of teeth of the interengaging pinions and gears 20b—21b and 20c—21c respectively; 25b—22b and 25c—22c respectively; 26b—27b and 26c—27c respectively, are selected accordingly.

The control disks 16a, 16b, and 16c are respectively provided with peripheral grooves or slots 28a, 28b, 28c for respective engagement by retention pins 29a, 29b, 29c, each retention pin being guided in a slide. These retention pins 29a, 29b and 29c are respectively held by pressure springs 30a, 30b, and 30c against the periphery of corresponding control disks 16a, 16b and 16c, and are respectively connected to the electromagnets 31a, 31b, and 31c. The retention pins 29a, 29b, and 29c can be lifted off the peripheries of their corresponding control disks 16a, 16b, and 16c, and thus be rendered ineffective, by the electromagnets 31a, 31b, and 31c. The control disks 16a, 16b, and 16c are respectively provided with cams or dogs 32a, 32b, and 32c which respectively cooperate with electric switches, 33a, 33b, and 33c. The switches 33a, 33b, and 33c constitute parts of an electric control device, not shown in the drawings, advantageously a control device operated with punched cards or with keys, in which separate circuits for adjustment of the units, the tens, and the hundreds are provided. The control device operates in such manner that the cams or dogs 32a, 32b, and 32c by respectively contacting the switches 33a, 33b, and 33c cause the recording or storage of the current impulses transmitted to one of the said circuits, and cause disconnection of the electromagnets 31a, 31b, or 31c in accordance with the adjusted numeral on the punched card or on the keyboard of the control device, with the result that the retention pins 29a, 29b, and 29c respectively connected to the corresponding electromagnets 31a, 31b, and 31c, are released, and are thus respectively held by the action of the pressure springs 30a, 30b, and 30c against the respective control disks 16a, 16b, and 16c, and, as they pass, snap into the respective grooves 28a, 28b, and 28c, thus locking the respective control disk 16a, 16b, or 16c; it will be understood that, instead of cooperating with the control disks 16a, 16b, and 16c, the retention pins may also cooperate with the respective drive gears 21a, 21b, and 21c of the planetary gear.

When the electric motor is started, the driving shaft 13 is driven through the worm gear 14. So long as the electromagnets 31a, 31b, and 31c are inoperative, the control disks 16a, 16b, and 16c are locked by the retention pins 29a, 29b, and 29c. When, however, the electromagnets 31a, 31b and 31c are switched on, the retention pins 29a, 29b, and 29c are respectively withdrawn from the grooves 28a, 28b, and 28c, and the corresponding control disks 16a, 16b, and 16c rotate together with the driving shaft 13.

With the stepping-down of the planetary gear referred to, one revolution of the control disk 16a causes the driven gear 27a and the sun gear 22b connected thereto to rotate through $\frac{1}{10}$ of a revolution. This rotation of the sun gear 22b, geared down in the ratio of 10:1, is transmitted to the gear 27b by the planet pinion 25b and the pinion 26b secured thereto, so that the gear 27b and the sun gear 22 secured thereto rotate through $\frac{1}{100}$ of a revolution. In the same manner, the rotation of the sun gear 22c is geared down in the ratio of 10:1, that is to say, it is transmitted as $\frac{1}{1000}$ of a revolution to the driven gear 27c, and the adjusting shaft 7 connected thereto. By one revolution of the control disk 16a, the adjusting arm is, therefore, displaced by one unit, by one revolution of the control disk 16b by 10 units, and by one revolution of the conrtol disk 16c by one-hundred units of the graduation on the dial 9. Where, for example, the adjusting shaft 7 with the adjusting arm 8 is required to be displaced on the graduation of the dial by 495 units, the electromagnets 31a, 31b, and 31c are controlled by the control device by means of a correspondingly punched card or by a corresponding key being contacted, in such manner that the control disk 16a is released to carry out five revolutions, the control disk 16b is released to carry out nine revolutions, and the control disk 16c is released to carry out four revolutions. The revolutions of the adjusting shaft 7 produced by the control disks 16a, 16b, and 16c, add-up, so that the adjusting arm is displaced by the required 495 units of the graduation on the dial 9.

When it is desired to return the adjusting arm 8 from any optional adjusted position to the zero position, the electric motor 15 is started to rotate in the opposite direction, the electromagnet 31a being switched-on first with the result that the control disk 16a is released by its corresponding retention pin 29a. The driven gear 27a is provided with a cam 34a, which cooperates with an electric switch 35a. The position at which the cam 34a is provided on the driven gear 27a is such that the switch 35a is operated when the gear 27a and, thus, the control disk 16a are returned to the zero position, and operation of the switch 35a causes disconnection of the electromagnet 31a, so that the retention pin 29a snaps into the groove 38a of the control disk 16a thus locking it. The driven gear 27b, too, is provided with a cam 34b and a cam 34c is also provided on the driven gear 27c, the cams 34b and 34c cooperating respectively with switches 35b and 35c. The reversal of the control disk 16a is followed in similar manner by reversal of the control disk 16b, and subsequent reversal of the control disk 16c. The construction of the cams 34a, 34b, and 34c is advantageously such that they only operate their corresponding switches 35a, 35b, and 35c when the rotation of the respective driven gears 27a, 27b, and 27c is reversed.

The flange of the bushing 3 is provided with radial slots 3a for engagement by the screw 4, so that the zero position of the adjusting arm 8 can be connected. After unscrewing of the screw 4, the bushing 3 can be rotated according to the correction to be made, and can then be fixed in the new position by the screw 4. By rotating the bushing 3 and, thus, the shaft 5, pinned thereto, and the sun gear 22a secured to the shaft 5, through one complete revolution, the adjusting arm 8 is displaced by $\frac{1}{1000}$ of a revolution, that is, by one unit of the dial graduation.

A spiral spring 36 one end of which is secured to the adjusting shaft 7, its other end being secured to a pin 37 which is inserted in the rear wall 2, is provided in order to neutralize the effect of the play of the gears on the accuracy of adjustment of the adjusting arm 8.

The spiral spring 36 is provided with initial tension during the assembly, with the result that a corresponding torque, which has a retroactive effect on the whole gearing is exerted on the adjusting shaft 7, so that the play of the gears is neutralized constantly in the same direction. In constructions, in which the adjusting shaft 7 is required to be capable of carrying out several revolutions, the spiral spring 36 may, for example, be replaced by a Ferraris motor the rotor of which is secured to the adjusting shaft 7.

Instead of providing the adjusting arm 8 with the light-source 10 and the photoelectric cell 11 hereinbefore referred to, any other signalling device which may, for example, have a capacitative or an inductive effect, and which cooperates with the pointer 12 of the dialled weighing machine, may be provided on the adjusting arm 8.

I claim:

1. In a device for the pre-setting of the required weights in dial weighing machines, having a pointer, an adjusting shaft, and a signalling device comprising an electric light source and a photoelectric cell, the combination of an adjusting arm being secured to said adjusting shaft, said adjusting arm carrying said signalling device, and said signalling device cooperating with said pointer, cooperating coaxial planetary gears being connected in series and driving said adjustment shaft, the number of planetary gears provided corresponding to the number of decimals in the graduation scales of the dial, and said planetary gears being driven by a reversibly driven driving shaft, on which control disks for the respective planetary gears are rotatable, the control disks being connected by a friction clutch to the driving shaft and being respectively provided with pinions which respectively drive the drive gear of the corresponding planetary gears, and the control disks being respectively provided with locking means, which locking means are controlled by an electric control device in such manner that the control disks of the planetary gears are respectively released for carrying out a number of revolutions which corresponds to the adjustment of the required corresponding decimal.

2. A device according to claim 1, in which the planetary gears are mounted on a shaft extending parallel to the driving shaft and coaxially with the adjusting shaft, each planetary gear comprising a drive gear rotatable on the hub of a sun gear which is mounted on the said shaft, a planet gear mounted on an axle journal extending parallel to the shaft and inserted securely in the drive gear, the planet gear meshing with the sun gear, a pinion which is secured to the planet gear, and a driven gear which is mounted on the said shaft and meshes with the said pinion, the sun gear of the first planetary gear being non-rotatably mounted on the said shaft, while the sun gears of the subsequent planetary gears are secured to the driven gears of the preceding planetary gears, and the driven gear of the last planetary gear being secured to the adjusting shaft.

3. A device according to claim 1, in which the locking of the plate cam of each planetary gear is effected by a retention pin which is guided in a slide and capable of snapping into a peripheral groove provided in the control disk, the said retention pin being held against the control disk by a pressure spring and being provided with an electromagnet by which it can be lifted off the control disk.

4. A device according to claim 1, in which each control disk is provided with a cam which cooperates with an electric switch by which, at each revolution of the control disk a current impulse is transmitted to the electric control device.

5. A device according to claim 1, in which the driven gear of each planetary gear is provided with a cam which, upon reversal of the rotation of the driven gear cooperates with an electric switch, the selected position of the said cam on the driven gear and with respect to the position of the switch being such that the switch is operated when the driven gear and its respective plate cam by operating the switch have returned to the zero position with the result that the corresponding electromagnet is disconnected and the respective plate cam is locked by its retention pin.

6. A device according to claim 1, in which one end of the shaft is mounted in and pinned to a bushing which is inserted in a bearing-aperture provided in a wall of the housing, a radially slotted flange of the bushing resting externally against the wall of the housing and being secured by a screw which is passed through one of the slots provided in the flange, all in such manner that, after unscrewing of the screw, the bushing with the shaft pinned thereto, and the sun gear of the first planetary gear secured to the shaft, can be turned for correcting the zero position of the adjusting arm.

7. A device according to claim 1, in which means are provided so that an additional torque, always acting in the same direction and having a retroactive effect on the whole gearing thus neutralizing the play of the gears, is adapted to act on the adjusting shaft.

References Cited in the file of this patent
UNITED STATES PATENTS

| | | |
|---|---|---|
| 2,055,730 | Rees | Sept. 29, 1936 |
| 2,067,743 | Weckerly | Jan. 12, 1937 |
| 2,169,465 | Hadley | Aug. 15, 1939 |
| 2,717,524 | Davis | Sept. 13, 1955 |
| 2,776,103 | Bradley | Jan. 1, 1957 |
| 2,851,905 | Clark | Sept. 16, 1958 |
| 2,900,848 | Henn-Collins | Aug. 25, 1959 |